United States Patent [19]

Jang

[11] Patent Number: 5,881,865
[45] Date of Patent: Mar. 16, 1999

[54] ELECTRIC SWITCH HOUSING

[76] Inventor: Huey Ju Jang, No. 102, Yeong-yih Road, Taiping City, Taichung County, Taiwan

[21] Appl. No.: 55,053

[22] Filed: Apr. 3, 1998

[51] Int. Cl.$^6$ ............................................. H01H 9/02
[52] U.S. Cl. ........................... 200/303; 200/295; 200/296
[58] Field of Search ..................... 200/293, 294, 200/295, 296, 303, 307; 361/673, 825

[56] References Cited

U.S. PATENT DOCUMENTS

| 3,859,492 | 1/1975 | Brandell | 200/293 |
| 4,454,565 | 6/1984 | Krasij et al. | 200/295 X |
| 5,436,604 | 7/1995 | Mrenna et al. | 200/303 X |
| 5,438,483 | 8/1995 | Fasano et al. | 200/296 X |
| 5,541,569 | 7/1996 | Jang | 337/68 |

*Primary Examiner*—J. R. Scott
*Attorney, Agent, or Firm*—Pro-Techtor International Services

[57] ABSTRACT

A housing of electric switch is composed of a main body, a top cover, and a cover plate. The component parts of the electric switch are mounted in the main body. The top plate by the plurality of fastening bolts. The main body and the cover plate are made of a bakelite material resistant to heat and nonconductive to electricity. The top cover is made of a pliable plastic material and is therefore elastically deformable.

1 Claim, 3 Drawing Sheets

ELECTRIC SWITCH HOUSING

FIELD OF THE INVENTION

The present invention relates generally to an electric switch, and more particularly to a housing of the electric switch.

BACKGROUND OF THE INVENTION

The conventional housings of the electric switch are generally made of a plastic or bakelite material. The housing made of the plastic material is not resistant to heat and is therefore susceptible to deformation. The housing made of a bakelite material is susceptible to severance even though it is resistant to heat.

SUMMARY OF THE INVENTION

The primary objective of the present invention is therefore to provide the electric switch with a housing which is resistant to heat and deformation.

In keeping with the principle of the present invention, the foregoing objective of the present invention is attained by an electric switch housing, which is mainly composed of a main body, a top cover, and a cover plate. The main body and the cover plate are made of a bakelite material, whereas the top cover is made of a plastic material. The main body and the cover plate are therefore resistant to heat and nonconductive to prevent the passage or leakage of electricity. The top cover is elastically deformable and resistant to severance.

DETAILED DESCRIPTION OF THE EMBODIMENT

Figure 1:
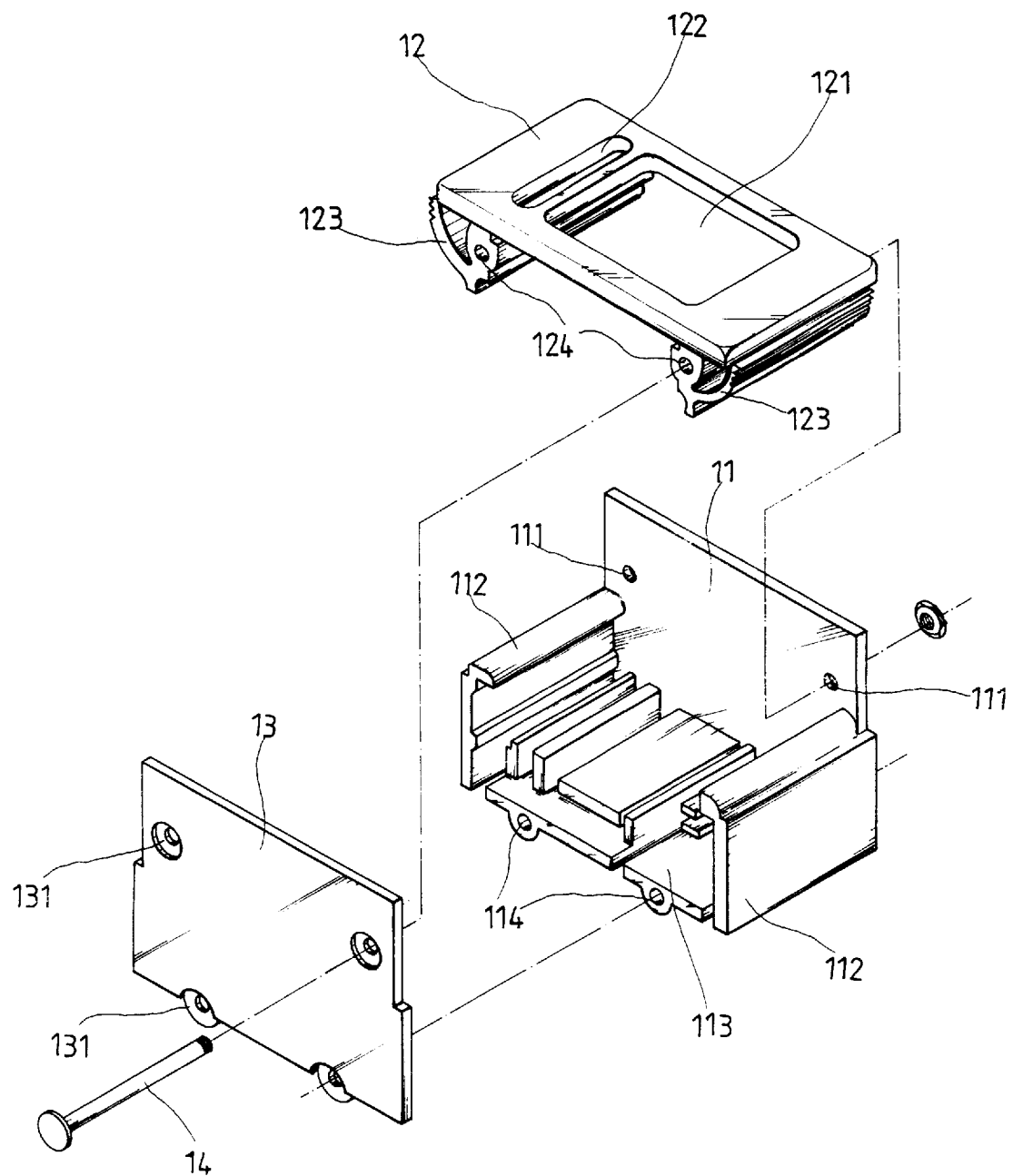
FIG. 1 shows an exploded view of the preferred embodiment of the present invention.
Figure 2:
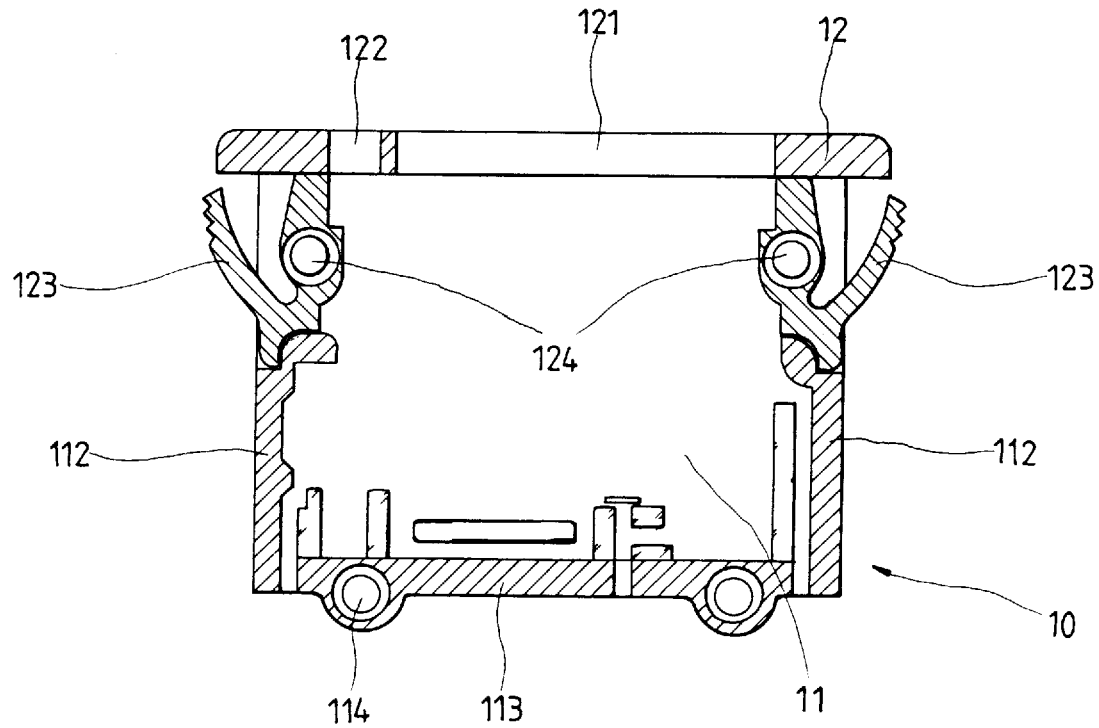
FIG. 2 shows a sectional view of the present invention in combination.
Figure 3:
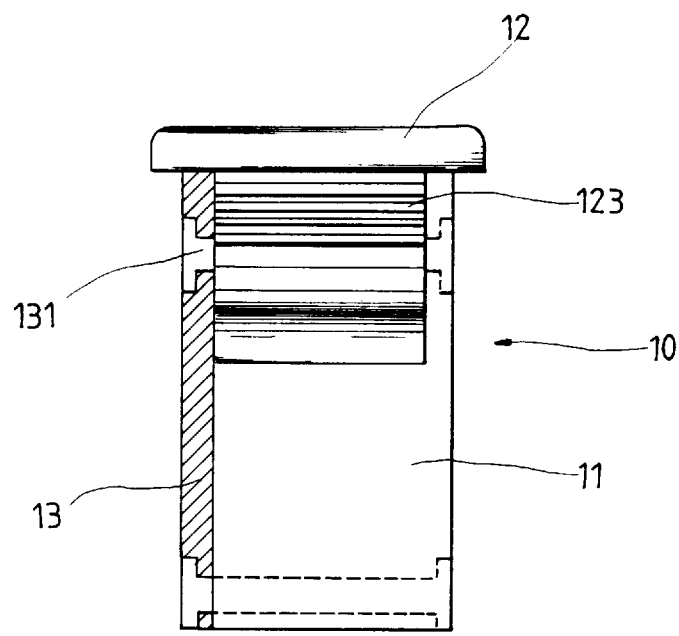
FIG. 3 shows a side view of the present invention.
Figure 4:
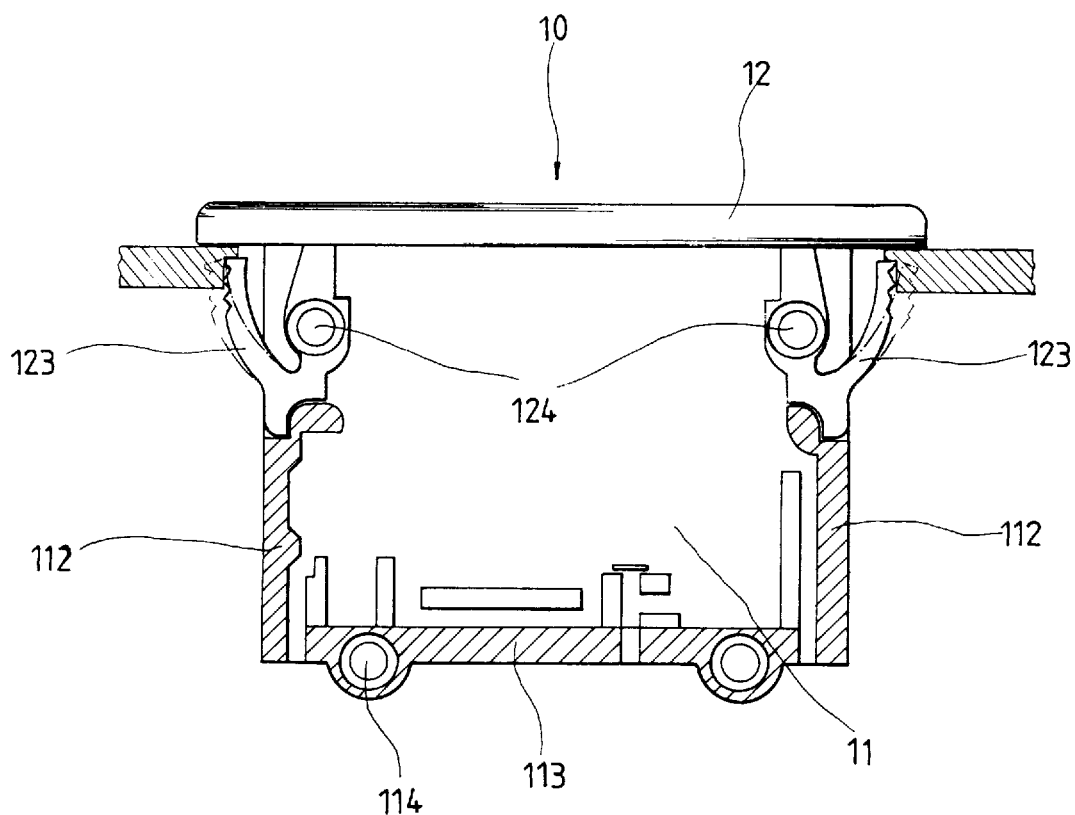
FIG. 4 shows a schematic view of the present invention is operation.

As shown in FIGS. 1–4, an electric switch housing 10 embodied in the present invention is composed of a main body 11, a top cover 12, and a cover plate 13.

The main body 11 is made of a bakelite material and is provided in one side thereof with two fastening holes 111. The main body 11 has two side plates 112 opposite to each other in location and perpendicular to a bottom plate 113. The bottom plate 113 is provided in one side wall thereof with two fastening holes 114.

The top cover 12 is made of a pliable plastic material and is provided in the top side thereof with an open slot 121 and a receiving hole 122 contiguous to the open slot 121. The top cover 12 is provided respectively near two opposite ends of the underside thereof with a resilient portion 123 having a through hole 124.

The cover plate 13 is made of a bakelite material and is provided in the lower portion thereof with two lower fastening holes 131 corresponding in location to the fastening holes 114 of the main body 11, and in the upper portion thereof with two upper fastening holes 131 corresponding in location to the fastening holes 111 of the main body 11.

In combination, the component parts of the electric switch are first mounted in the main body 11 before the top cover 12 is joined with the main body 11 such that the two resilient portions 123 of the top cover 12 are rested on the two side plates 112 of the main body 11. The cover plate 13 is then fastened with the main body 11 by four fastening bolts 14 which are received in the fastening holes 111 and 114 of the main body 11 and the fastening holes 131 of the cover plate 13. The top cover 12 is fastened with the main body 11 and the cover plate 13 by two bolts 14 which are received in the upper fastening holes 131 of the cover plate 13, the through holes 124 of the top cover 12 and the fastening holes 111 of the main body 11.

The housing 10 of the present invention is insulated and resistant to heat and severance in view of the fact that the main body 11 and the cover plate 13 are made of a bakelite material which is insulating and heat-resistant, and that the top cover 12 is made of a pliable plastic material which is resistant to severance.

The embodiment of the present invention described above is to be deemed in all respects as being merely illustrative and not restrictive. Accordingly, the present invention may be embodied in other specific forms without deviating from the spirit thereof. The present invention is therefore to be limited only by the scope of the following appended claim.

What is claimed is:

1. A housing of an electric switch, said housing comprising:

a main body made of a bakelite material for mounting therein component parts of the electric switch, said main body has one side provided with two fastening holes, a bottom plate provided with two fastening holes, and two side plates opposite to each other in location and perpendicular to said bottom plate;

a top cover made of a pliable plastic material and provided in a top side thereof with an open slot and a receiving hole, said top cover further provided in an underside thereof with two resilient portions each having a through hole;

a cover plate made of a bakelite material and provided with two upper fastening holes and two lower fastening holes; and four fastening bolts for fastening said top cover and said cover plate with said main body such that two of said four bolts are received in said two upper fastening holes of said cover plate, said two through holes of said two resilient portions of said to cover, and said two fastening holes of said one side of said main body, and that another two of said four blots are received in said two lower fastening holes of said cover plate and said two fastening holes of said bottom plate of said main body.

* * * * *